United States Patent [19]

Brynn

[11] 4,201,401
[45] May 6, 1980

[54] PASSIVE LAP AND SHOULDER BELT SYSTEM

[75] Inventor: Gerald E. Brynn, West Bloomfield, Mich.

[73] Assignee: General Motors Corporation, Detroit, Mich.

[21] Appl. No.: 23,687

[22] Filed: Mar. 26, 1979

[51] Int. Cl.² ............................................. B60R 21/10
[52] U.S. Cl. .................................... 280/803; 280/808
[58] Field of Search ............... 280/802, 803, 804, 807, 280/808; 297/469, 474, 475, 483

[56] References Cited

U.S. PATENT DOCUMENTS

| | | | |
|---|---|---|---|
| 3,692,328 | 9/1972 | Arlauskas | 280/803 |
| 3,770,078 | 11/1973 | Keppel | 280/803 |
| 3,827,714 | 8/1974 | Lefeuvre | 280/802 |
| 3,831,878 | 8/1974 | Griffin | 280/803 |
| 3,833,239 | 9/1974 | Coenen | 280/803 |
| 4,138,142 | 2/1979 | Wize | 280/803 |

FOREIGN PATENT DOCUMENTS 1388382  3/1975  United Kingdom ...................... 280/802

Primary Examiner—Richard A. Bertsch
Assistant Examiner—Randall A. Schrecengost
Attorney, Agent, or Firm—Charles E. Leahy

[57] ABSTRACT

In a passive seat belt system, the outboard ends of the lap and shoulder belts are respectively mounted at upper and lower locations on the vehicle door. The inboard ends of the lap and shoulder belts are joined together and are attached to a pivot belt having an inboard end fixedly mounted on the vehicle body substantially forward of the inboard occupant hip. The pivot belt has a fixed length adapted to define an arcuate path of horizontal swinging movement of the inboard ends of the lap and shoulder belts between restraining positions adjacent the inboard occupant hip when the door is closed and a stowed position substantially forwardly of the occupant hip when the door is open. A control belt is connected to the juncture of the lap, shoulder and pivot belts. A control belt retractor is mounted on the vehicle body generally adjacent the inboard hip of the occupant and is adapted to retract the control belt when the door is closed to draw the inboard restraint belt ends rearwardly in the arcuate swinging path defined by the pivot belt to a point substantially adjacent the inboard hip to establish the lap and shoulder belts in their respective restraining positions closely adjacent the occupant.

4 Claims, 2 Drawing Figures

PASSIVE LAP AND SHOULDER BELT SYSTEM

The invention relates to a passive occupant restraining lap and shoulder belt system.

It is well known in motor vehicles to restrain an occupant in the seat by a lap belt disposed across the lap and a shoulder belt disposed diagonally across the chest. It is also known to connect the outboard belt ends to the door so that the swinging movement of the door automatically moves the belts between a restraining position about the occupant and a stowed position forwardly of the seat. It has been recognized as desirable to provide some means for also moving the inboard portions of the lap and shoulder belt somewhat forwardly of the seat to further facilitate occupant ingress and egress. One such means for moving the inboard belt ends forward is shown in U.S. Pat. Coenen No. 3,833,239 where a floor mounted track extends forwardly of an inboard retractor and mounts a guide loop which moves the belt forward to improve occupant access. Lefeuvre U.S. Pat. No. 3,827,714 and Great Britain Pat. No. 1 388 382 have vertically pivotable arms mounted adjacent the forward edge of the seat for lifting the belt upwardly and forwardly.

The present invention provides a new and improved passive lap and shoulder belt system wherein a fixed length pivot belt and an adjustable length control belt cooperate to move the inboard end of the restraint belt in a horizontal arc between a restraining position adjacent the occupant hip and a stowed position forward of the occupant hip.

According to the invention the outboard ends of the lap and shoulder belt are respectively mounted at upper and lower locations on the vehicle door. The inboard ends of the lap and shoulder belts are joined together and are attached to a pivot belt having an inboard end fixedly mounted on the vehicle body substantially forward of the inboard occupant hip. The pivot belt has a fixed length adapted to define an arcuate horizontal path of swinging movement of the inboard ends of the lap and shoulder belts between restraining positions adjacent the inboard occupant hip when the door is closed and a stowed position substantially forwardly of the occupant hip when the door is open. A control belt is connected to the juncture of the lap, shoulder and pivot belts. A control belt retractor is mounted on the vehicle body generally adjacent the inboard hip of the occupant and is adapted to retract the control belt when the door is closed to draw the inboard restraint belt ends rearwardly in the arcuate swinging path defined by the pivot belt to a point substantially adjacent the inboard hip. Accordingly, when the vehicle door is closed the inboard swinging movement of the outboard belt ends by the closing movement of the door and the inboard swinging movement of the inboard belt ends by the cooperation of the pivot belt and the control belt retractor establish the lap and shoulder belts in their respective restraining positions closely adjacent the occupant.

Accordingly, the object, feature and advantage of the invention resides in the provision of a pivot belt fixedly mounted on a vehicle body forward the occupant hip and adapted to define an arcuate path of horizontal swinging movement of the inboard restraint belt and between a restraining position adjacent the occupant hip and a stowed position forwardly of the occupant hip to facilitate occupant ingress and egress.

A further object, feature and advantage of the invention resides in provision of a fixed length pivot belt and a retractable control belt attached to the inboard ends of door mounted restraint belts for swinging the inboard belts end between a forward position when the door is opened and a rearward restraining position closely adjacent to the occupant hip when the door is closed.

These and other features, objects and advantages of the invention will become apparent upon consideration of the specification and the appended drawings in which.

DESCRIPTION OF THE PREFERRED EMBODIMENT

Figure 1:
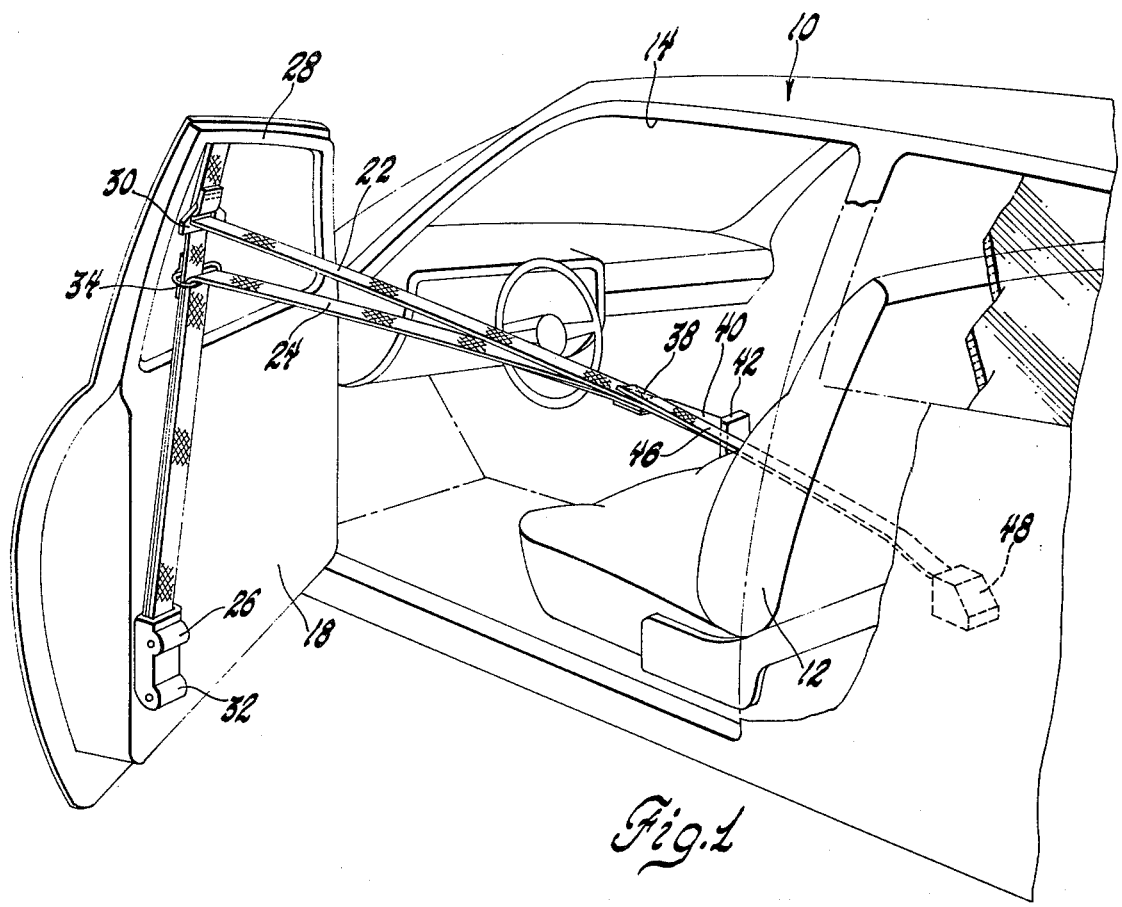
FIG. 1 is a perspective view of the vehicle body having a restraint belt system according to the invention shown with the door opened to establish the belts in the occupant access positions.

Referring to FIG. 1 there is shown a vehicle body 10 having a seat 12 located laterally adjacent a door opening 14. A door 18 is hingedly mounted on the vehicle body 10 for movement between an open position shown in FIGS. 1 and 2 and a phantom line indicated closed position of FIG. 2.

A passive occupant restraint system for restraining an occupant in the seat 12 includes a shoulder belt 22 and a lap belt 24. As best seen in FIG. 1, the outboard end of the lap belt 24 is connected to the lower rear corner of the door 18 by a lap belt retractor 26. The outboard end of the shoulder belt 22 is slidably mounted on the window frame 28 of the door 18 by an anchor loop 30 and extends downwardly therefrom to a shoulder belt retractor 32 mounted on the lower rear corner of the door 18 adjacent the lap belt retractor 26. A guide loop 34 is attached to the shoulder belt 22 and has a central aperture which slidably receives lap belt 24. The lap belt retractor 26 and the shoulder belt retractor 32 have winding springs associated therewith for winding the lap and shoulder belts thereon.

The guide loop 34 is attached to the shoulder belt 22 at a point thereon which travels vertically between a position generally adjacent the anchor loop 30 when door opening movement unwinds the shoulder belt from the shoulder belt retractor 32 and a position generally adjacent the retractors 26 and 32 when door closing movement winds the shoulder belt on the shoulder belt retractor 32. Accordingly, door opening movement lifts the lap belt off the occupant's lap when the door is open and lowers the lap belt 24 onto the occupant when the door 18 is closed.

A more complete description of the aforedescribed manner in which the outboard belt ends are attached to the door may be had by reference to the U.S. Pat. No. 4,138,142 by Gary Wize.

The lap and shoulder belt retractors 26 and 32 each have a prior art latch mechanism associated therewith to selectively lock the reels against the belt unwinding. The latch mechanism may be of the inertia actuated type such as U.S. Pat. to Griffin No. 3,831,878, issued Aug. 22, 1974 or of the type connected to the door handle as in U.S. Pat. to Keppel et al No. 3,770,078, issued Nov. 6, 1973, or Arlauskas et al U.S. Pat. No. 3,692,328, issued Sept. 19, 1972.

Figure 2:
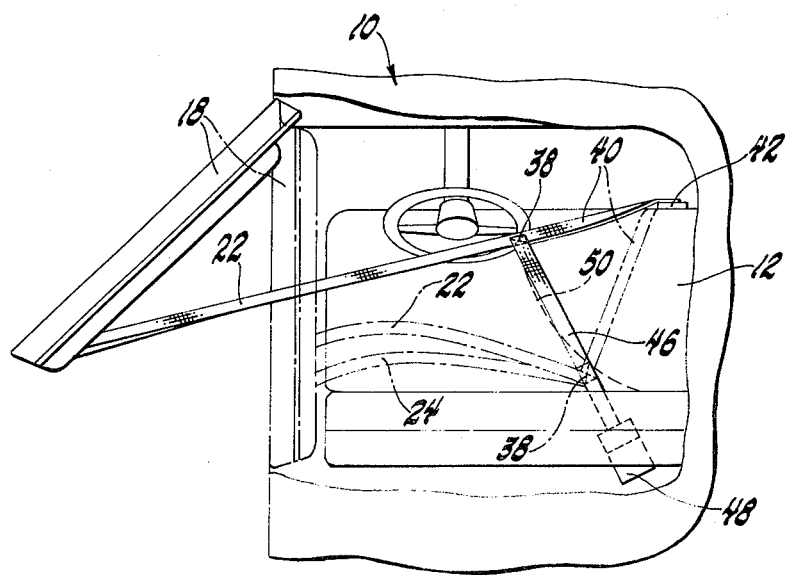
FIG. 2 is a plan view of the seat belt system of FIG. 1 and includes a phantom line representation of the occupant restraining position of the seat belt system when the vehicle door is closed.

Referring again to FIGS. 1 and 2, it is seen that the inboard ends of lap belt 24 and shoulder belt 22 are connected together at a belt juncture 38. A pivot belt 40 is suitably connected to the inboard lap and shoulder belt ends at the belt juncture 38 and has an inboard end fixedly attached to the vehicle body by an anchorage 42 which is preferably an upstanding post or the like mounted on the vehicle floor adjacent the forward edge of the seat and substantially forward the occupant hip. As best seen in FIG. 2, when the door 81 is open the pivot belt 40 is colinear with the shoulder belt 22 and lap belt 24 so that the lap and shoulder belts are established substantially forwardly of the occupant's seated position to facilitate occupant in ingress and egress.

A control belt 46 is also attached to the lap and shoulder belts at the belt juncture 38. The other end of the control belt 46 is mounted on the vehicle body generally adjacent the occupant hip by a control belt retractor 48.

Referring to FIG. 2, it will be understood that closing the door to the phantom line indicated position swings the outboard ends of the lap and shoulder belts inwardly and allows winding thereof on the lap belt retractor 26 and the shoulder belt retractor 32. Simultaneous retraction of the control belt 46 by the control belt retractor 48 causes the belt juncture 38 to swing horizontally about the anchorage 42 in a generally arcuate path indicated by the dash line 50 as determined by the fixed length of the pivot belt 40. Retraction of the control belt 46 establishes the belt juncture 38 at the phantom line indicated position of FIG. 2 in which the inboard ends of the lap and shoulder belts are established generally adjacent the inboard occupant hip so that the lap and shoulder belts are disposed in their respective restraining positions closely adjacent the occupant.

Referring to FIG. 2, it will be understood that the location of the anchorage 42 will be determined by the seating geometry of the particular vehicle and by the swing geometry of the door. For example, in some vehicle applications, the anchorage 42 may be located at a position so that the length of the pivot belt 40 can fully compensate for the outboard swinging movement of the door and there is no need for the provision of a retractor at the door mounted ends of the belts. In such an application, the control belt retractor 48 may be of the conventional spring wound type having a retracting effort which is sufficient to wind the control belt 46 when the door is closed without imposing a significant load on the belts which would resist the opening movement of the door 18.

In the particular seat belt system shown in the drawings, the control belt retractor 48 is preferably of the type having an electric motor associated therewith for forcibly retracting the control belt 46 whenever the door is closed. Such a retractor and an electrical control circuit therefore are disclosed in U.S. Pat. application No. 024,108 by Larry Miller, assigned to the assignee of this invention and incorporated herein by reference. Such a shoulder belt retractor has a low effort winding spring sufficient to prevent the control belt from falling slack upon the seat but no so great as to resist the outward swinging movement of the door and the winding of the lap and shoulder belts upon the retractors 26 and 32.

In view of the foregoing, it will be understood that the Applicant's invention is characterized by the use of a fixed length pivot arm and a retractable control belt for moving the inboard end of a restraint belt between a forward occupant access position and a rearward occupant restraint position. Accordingly, it will be understood that the pivot belt may be an integral extension of the lap belt, the shoulder belt or the control belt. Furthermore, it will be understood that the outboard end of the restraint belt may be moved to an occupant access position generally forward the occupant's seat by any of several devices taught by the prior art. For example, the outboard end of the shoulder belt may be retractably mounted on the roof and moved forwardly along the roof rail upon door opening movement as taught by patents such as U.S. Pat. to Keppel No. 3,770,078, issued Nov. 6, 1973. Furthermore, the invention may be effectively employed whether the restraint belt arrangement is a lap belt alone, a shoulder belt alone, or a lap and a shoulder belt.

Accordingly, while this invention has been disclosed primarily in terms of the specific embodiment shown in the drawings, it is not intended to be limited thereto, but rather only to the extent set forth in the appended claims.

The embodiments of the invention in which an exclusive property or privilege is claimed are defined as follows:

1. In combination with a vehicle body having an occupant compartment in which an occupant seat is accessible through a door opening selectively opened and closed by a movable door, a passive occupant restraining belt arrangement comprising:

a restraint belt having an outboard end and an inboard end;

means mounting the outboard belt end on the vehicle body outboard the occupant and adapted to move the outboard belt end between a rearward restraining position closely adjacent the occupant when the door is closed and a stowed position forwardly of the occupant when the door is open;

a pivot belt having an inboard end fixedly mounted on the vehicle body substantially forwardly of the inboard occupant hip and an outboard end connected to the inboard end of the restraint belt, said pivot belt having a fixed length and being adapted to extend generally colinear with the restraint belt when the door is open so that the restraint belt is stowed forwardly of the occupant when the door is open to facilitate occupant access;

a control belt connected to the inboard end of the restraint belt and the outboard end of the pivot belt;

and a control belt retractor mounted on the vehicle body generally adjacent the inboard hip of the occupant and adapted to retract the control belt when the door is closed to draw the inboard restraint belt end rearwardly adjacent the occupant inboard hip and thereby establish the inboard restraint belt end in the restraining position closely adjacent the occupant.

2. In combination with a vehicle body having an occupant compartment in which an occupant seat is accessible through a door opening selectively opened and closed by a movable door, a passive occupant restraining belt arrangement comprising:

a restraint belt having an outboard end mounted on the vehicle door and an inboard end adapted for positioning adjacent the inboard occupant hip when the door is closed to restrain the occupant in the seat;

a pivot belt having an inboard end fixedly mounted on the vehicle body substantially forwardly of the inboard occupant hip and an outboard end connected to the inboard end of the restraint belt, said pivot belt having a fixed length adapted to define an arcuate path of horizontal swinging movement of the inboard restraint belt end between the restraining position adjacent the occupant hip when the door is closed and a position forwardly of the occupant hip when the door is open;

a control belt connected to the inboard restraint belt and the outboard end of the pivot belt;

and a control belt retractor mounted on the vehicle body generally adjacent the inboard hip of the occupant and adapted to retract the control belt when the door is closed to draw the inboard restraint belt end rearwardly to substantially adjacent the occupant inboard hip and thereby cooperate with the inboard swinging movement of the outboard restraint belt end during door closing movement to establish the restraint belt in the restraining position closely adjacent the occupant.

3. In combination with a vehicle body having an occupant compartment in which an occupant seat is accessible through a door opening selectively opened and closed by a movable door, a passive occupant restraining belt arrangement comprising:

a restraint belt having an inboard end and an outboard end;

a retractor mounting the outboard belt end on the vehicle door and adapted to wind and unwind the restraint belt during door movement between the open and closed positions;

a fixed length pivot belt having an inboard end fixedly mounted on the vehicle body substantially forwardly of the inboard occupant hip and an outboard end connected to the inboard end of the restraint belt so that the pivot belt extends colinear with the restraint belt to establish the inboard restraint belt end substantially forward of the occupant;

a control belt connected to the inboard restraint belt and the outboard end of the pivot belt;

and a control belt retractor mounted on the vehicle body generally adjacent the inboard hip of the occupant, said control belt retractor having selectively actuable drive means associated therewith to forcibly retract the control belt against the retracting effort of the restraint belt retractor to swing the inboard restraint belt end rearwardly to substantially adjacent the occupant inboard hip and thereby cooperate with the inboard swinging movement of the outboard restraint belt end during door closing movement to establish the restraint belt in the restraining position closely adjacent the occupant.

4. In combination with a vehicle body having an occupant compartment in which an occupant seat is accessible through a door opening selectively opened and closed by a movable door, a passive occupant restraining belt arrangement comprising:

a restraint belt having an outboard end mounted on the vehicle door and an inboard end fixedly mounted on the vehicle body substantially forwardly of the inboard occupant hip so that when the door is opened the belt is positioned substantially forwardly of the occupant by the swing geometry of the door to facilitate occupant ingress and egress;

a control belt connected to the restraint belt at a point thereon which is spaced from the inboard fixed end by a distance generally equal to the distance from the inboard occupant hip to the inboard fixed belt end;

and retractor means mounted on the vehicle body generally adjacent the inboard hip of the occupant, said inboard retractor means having means associated therewith to retract the control belt when the door is closed to draw the restraint belt rearwardly to substantially adjacent the occupant inboard hip and thereby dispose the restraint belt in a restraint position closely adjacent the occupant.

* * * * *